Nov. 24, 1936.    P. PATTERSON    2,061,670
HYDRAULIC MECHANISM
Filed Aug. 12, 1935    2 Sheets—Sheet 1
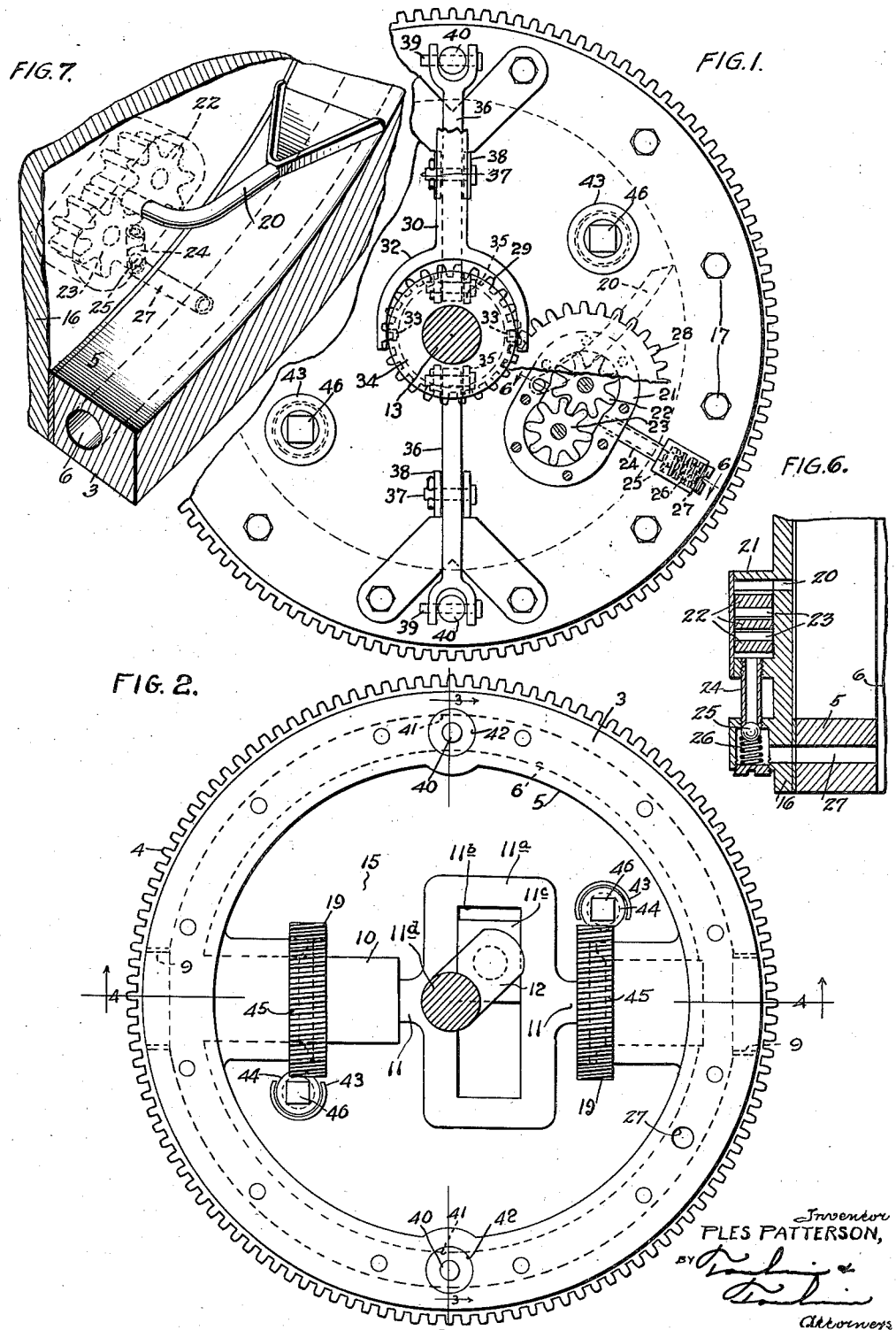
Inventor
PLES PATTERSON,
By
Attorneys Nov. 24, 1936.  P. PATTERSON  2,061,670
HYDRAULIC MECHANISM
Filed Aug. 12, 1935   2 Sheets—Sheet 2
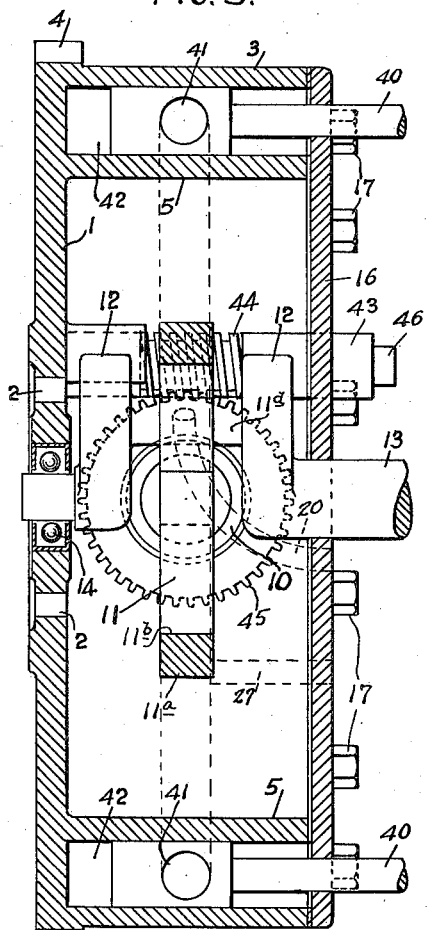
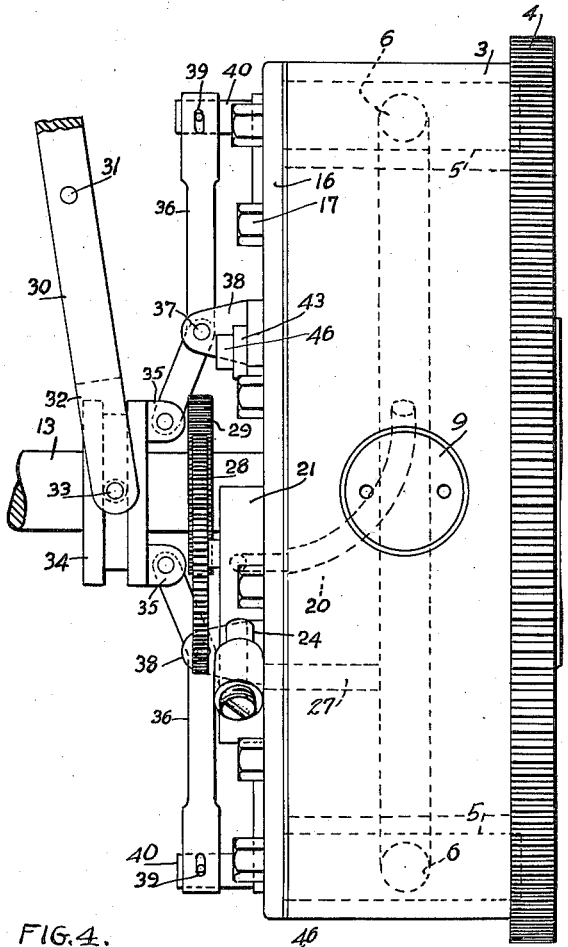
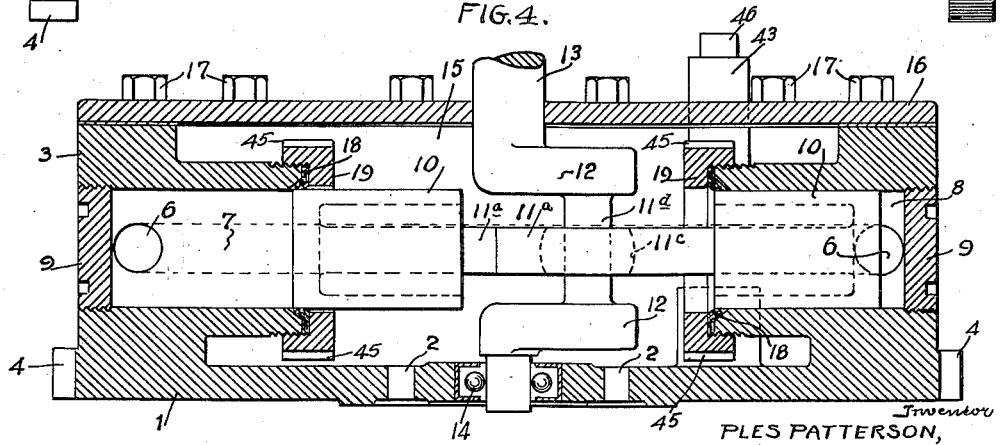
Inventor
PLES PATTERSON, Patented Nov. 24, 1936

2,061,670

UNITED STATES PATENT OFFICE 2,061,670

HYDRAULIC MECHANISM

Ples Patterson, Dayton, Ohio, assignor to Elmer Rauh, Dayton, Ohio

Application August 12, 1935, Serial No. 35,697

14 Claims. (Cl. 192—60)

It is the object of my invention to provide a hydraulic mechanism for adjusting the relative speed between a driving and driven means, such as between an internal combustion motor and the driving shaft, and to take the place of the customary clutch and gear shift.

It is a further object to provide such a mechanism that will permit infinite adjustment of the speeds of a vehicle from at rest to full speed by the adjustment of the position of a single lever or other single control means.

It is a further object to provide a fly-wheel for an internal combustion engine which embraces within it the hydraulic control for infinite change of speeds between the engine and the mechanism driven by it, while utilizing the fly-wheel as part of the hydraulic mechanism.

In particular it is the object of my invention to provide a hydraulic mechanism having one or more fluid actuating or actuated pumping means connected on one side to a hydraulic circuit and on the other side to a reservoir, and means connected therewith for replenishing the first mentioned circuit from the reservoir to maintain a predetermined supply of fluid therein.

It is a further object to provide a rotary hydraulic mechanism in which the hydraulic fluid is handled in peripheral circuits and the fluid is thrown out centrifugally and collected and supplied to the circuits.

It is a further object of the invention to provide in combination with an internal combustion engine of a hollow fly-wheel having an annular external circuit connected to a plurality of cylinders, with adjusting means for controlling the rotary movement of the fluid in said passageway and in the cylinders to thereby control the speed of a power shaft driven thereby with respect to the speed of the fly-wheel; and to include in the combination a crank on the driven shaft and connected to the piston rods of said pistons so as to translate the rotary movement of the fly-wheel to the driven shaft in varying speeds according to the control of the flow of fluid in the passageway and the cylinders.

It is a further object to provide means of replenishing and maintaining at a predetermined constant the fluid in the cylinders and passageway, and to secure this fluid for this purpose from a reservoir formed on the interior of the hollow fly-wheel from which the fluid is extracted as it is thrown out centrifugally on the inside of the hollow fly-wheel towards the outer wall thereof.

Heretofore, attempts to make a hydraulic substitution for the clutch and change speed gearing of an automobile have met with failure because of leakage and the external complication of the mechanism. The object of the present invention is to provide a very cheap and very simple but powerful and effective mechanism for accomplishing the object desired.

Referring to the drawings:

Figure 1 is a rear elevation with the drive shaft in section and a part of the gearing and cover for the replenishment pump broken away.

Figure 2 is a rear elevation wth the driven shaft in section and the cover with associated mechanism removed.

Figure 3 is a section on the line 3—3 of Figure 2.

Figure 4 is a section on the line 4—4 of Figure 2.

Figure 5 is a side elevation of the hydraulic mechanism.

Figure 6 is a sectional view of the pump mechanism taken on the line 6—6 of Figure 1.

Figure 7 is a perspective view partly in section of the oil replenishing mechanism.

Referring to the drawings in detail, I designates one wall of a fly wheel that is bolted by suitable bolts through the bolt holes 2 to the end of a crank shaft of an internal combustion engine that is not shown. Any form of prime mover or driving mechanism may be connected to the fly-wheel face 1. An annular wall 3 forms the side of the fly-wheel. The teeth 4 thereon are employed as the starter teeth for engaging with the motor-driven starter pinion for starting the engine.

Within the outer annular wall 3 is an inner annular wall 5, forming with the wall 3 an annular passageway 6 which communicates with oppositely-disposed cylinders 7 and 8 that are radially disposed with respect to the central axis of the fly-wheel. The passageway 6 communicates with the outer ends of these cylinders. The ends of the cylinders are closed by the removable plugs 9. Within the cylinders are mounted pistons 10 connected by piston rods 11 to a crank 12 of a driven shaft 13. The free end of this shaft is mounted within the bearing 14 and the wall 1 of the flywheel. The wall 5 thereby forms a chamber 15 within the fly-wheel which is enclosed by the cover 16 retained in position by the bolts 17. The leakage from the cylinders 7 and 8 to one side of the packing 18 held in position by the threaded packing glands 19 enters this chamber 15 which acts as a reservoir.

Due to the centrifugal force acting on this surplus oil within the chamber 15, the oil arranges itself in a body within the wall 5, into which area projects the scoop 20 which delivers oil into the gear pump 21. The pump impellers 22 and 23 deliver this oil through the passageway 24, lifting the spring-pressed check valve ball 25 pressed downwardly by the spring 26, from whence the oil passes through the port 27 into the chamber 6 to replenish the supply in that chamber. When this supply is sufficient, the back pressure, plus the pressure of the spring 26, will set the ball 25, and no further fluid will be delivered until the leakage from cylinders 7 and 8 is sufficient to permit of the addition of more oil to the passageway 6. The pump 21 is driven by a gear 28, which in turn meshes with the pinion 29 mounted on the driven shaft 13 so that the pumping of the oil is synchronized with the speed of the driven shaft, as the need for replenishment of the oil is in proportion to the speed of the driven shaft. No by-pass is necessary for the pump because when the back pressure plus the pressure of spring 26 exceeds the pressure in the pump, the pump in operating builds up pressure to exceed the back pressure plus spring pressure; leakage occurs from cylinders 7 and 8 through packing 18, and thus there is a substantially constant pressure achieved in cylinders 7 and 8 and chamber 6, which is dependent upon adjustment of means 18, 19, 45, 46 (whereby leakage is regulated) and pressure of the spring 26.

Control mechanism

In order to adjust the speed ratio between the driving mechanism on the one side, to which the fly-wheel is connected, and the driven shaft 13 on the other side, I provide a lever 30 pivoted at 31, the lower end of which is provided with a yoke 32 and pins 33 on the yoke extending into the grooved collar 34 slidably mounted upon the shaft 13. This collar is connected by ears 35 to a pair of bell cranks 36 pivoted at 37 upon the supports 38 on the face or cover 16.

The free ends of these bell cranks have a loose connection at 39 with the sliding valve pins 40 which are provided with ports 41 and reciprocate in the chambers 42 between the walls 3 and 5 of the fly-wheel to control the rotary flow of fluid through the passageway 6, because as one piston discharges from its cylinder a part of the fluid in the passageway 6 and in the cylinder, the other piston is moving inwardly to draw in the displaced liquid. Any restriction of this movement will retard the movement of the piston and likewise adjust the speed of the driven shaft 13 to which the pistons are connected.

By adjusting the position of the lever 30, the flow of liquid through the passageway 6 is adjusted and the relative speed between the driving and driven sides of the hydraulic coupling can be thus adjusted.

The leakage from the cylinders 7 and 8 into the chamber 15 can be adjusted by rotating the threaded collars 19 to adjust the packing 18. This is accomplished without removing the cover 16 by rotating the adjusting screws 43, which are threaded at 44 to engage the threaded peripheries 45 of the members 19. The outer heads of these screws 41 are squared as at 46 to permit their actuation by a wrench.

Crank connection between the pistons 10 and driven shaft 13

The pistons 10 are rigidly formed on the ends of the piston rods 11. These piston rods are connected by a rectangular slotted member 11a having a rectangular slot 11b, in which reciprocates a slide block 11c mounted upon the cross pin 11d of the crank 12. As this reciprocating block 11c is moving within a body of oil contained within the chamber 15, it is constantly lubricated. This chamber is not under pressure so there is little leakage from it. The only joints that can leak are those around the packing 18 and leakage therefrom is not serious, as the leakage is into the oil reservoir 15.

By using rigid pistons 11 and inexpensive piston rods, a cheap construction is obtained. The alignment of the pistons and piston rods is maintained perfectly with the minimum of wear. As the pistons are operating in cylinders filled with oil, they are self lubricating.

It will be understood that suitable load and thrust bearings as between the cross pin 11d at the block 11c can be utilized, but as such things are within the scope of the design by an ordinary engineer, no claim is made to them herein.

It will be understood that I desire to comprehend within my invention such modifications as may be necessary to adapt it to varying conditions and uses.

Having thus fully described my invention, what I claim as new and desire to secure by Letters Patent, is:

1. In a hydraulic coupling, a hollow flywheel having therein a central fluid chamber, an encircling annular fluid passageway and cylinder means connected at one end to said chamber and at the other end to said passageway, piston means and piston rod means operating in said cylinder means, and a driven shaft connected to said piston rod means for operation thereby, means for regulating the movement of the fluid in said passageway to regulate the speed of said driven shaft and means operated by relative movement between said flywheel and said driven shaft for maintaining the quantities of fluid in said chamber and said passageway constant.

2. In a hydraulic coupling, a hollow flywheel having therein a central fluid chamber, an encircling annular fluid passageway and cylinder means connected at one end to said chamber, and at the other end to said passageway, said cylinder means having adjustable packing means whereby leakage from the passageway through the cylinder into the chamber may be regulated, piston means and piston rod means operating in said cylinder means, and a driven shaft connected to said piston rod means for operation thereby, means for regulating the movement of the fluid in said passageway to regulate the speed of said driven shaft, and means operated by relative movement between said flywheel and said driven shaft for maintaining the quantities of fluid in said chamber and said passageway constant.

3. In combination, a fly-wheel connected to driving means and having an annular fluid passageway and a central fluid chamber therein, oppositely disposed cylinders mounted in said flywheel radially thereof interconnected with said fluid passageway and said fluid chamber, pistons and piston rods interconnected with one another operating in said cylinder, a driven shaft connected to said piston rods and adapted to be driven thereby, and means to regulate the fluid flow in said annular passageway from one cylinder to the other to regulate the relative speed between the driving and driven means, said cylinders having means attached thereto to regulate leakage therethrough to said fluid chamber, and said flywheel having means thereon adapted to be operated by relative movement between said shaft and the flywheel to maintain a constant quantity of fluid in said passageway regardless of said leakage.

4. In combination, a fly-wheel connected to driving means and having an annular fluid passageway and a central fluid chamber therein, oppositely disposed cylinders mounted in said fly-wheel radially thereof interconnected with said fluid passageway and said fluid chamber, pistons and piston rods interconnected with one another operating in said cylinder, a driven shaft connected to said piston rods and adapted to be driven thereby, means to regulate the fluid flow in said annular passageway from one cylinder to the other to regulate the relative speed between the driving and driven means, said fly-wheel being arranged to form said fluid chamber by the walls of the fluid passageway within said fly wheel, said cylinders having means attached thereto to regulate leakage therethrough to said fluid chamber, and said flywheel having means thereon adapted to be operated by relative movement between said shaft and the flywheel to maintain a constant quantity of fluid in said passageway regardless of said leakage.

5. In combination, a fly-wheel connected to driving means having therein an annular fluid passageway and a central fluid chamber, oppositely disposed cylinders mounted in said fly-wheel radially thereof interconnected with said fluid passageway and said fluid chamber, pistons and piston rods interconnected with one another operating in said cylinders, a driven shaft connected to said piston rods and adapted to be driven thereby, means to regulate the fluid flow in said annular passageway from one cylinder to the other to regulate the relative speed between the driving and driven means, said fly-wheel being arranged to form by the walls of its fluid passageway said fluid chamber within said fly-wheel, means to cover said chamber, and means operated by relative movement between said fly-wheel and said shaft for extracting fluid from said chamber and delivering it into the fluid passageway in the fly wheel to maintain the quantity of fluid in said passageway and said chamber constant.

6. In combination, a fly-wheel connected to driving means having therein an annular fluid passageway and a fluid chamber, oppositely disposed cylinders mounted in said fly-wheel radially thereof interconnected with said fluid passageway and said fluid chamber, pistons and piston rods interconnected with one another operating in said cylinder, a driven shaft connected to said piston rods and adapted to be driven thereby, means to regulate the fluid flow in said annular passageway from one cylinder to the other to regulate the relative speed between the driving and driven means, said fly-wheel being arranged to form by the walls of its fluid passageway said fluid chamber within said fly wheel, means to cover said chamber, means operated by relative movement between said flywheel and said shaft for extracting fluid from said chamber and delivering it into the fluid passageway in the fly wheel, and scoop means for extending into said chamber adjacent the periphery thereof for collecting the fluid centrifugally delivered to the exterior portion of said chamber.

7. In combination, a fly-wheel connected to a driving means, a driven shaft having a crank supported within said fly-wheel, means to form an annular passageway in said fly wheel, cylinders oppositely disposed in said fly-wheel arranged radially thereof and communicating with said annular passageway, said cylinders having means for adjusting the leakage therethrough from said passageway, means to form a chamber within said fly wheel adapted to receive leakage from said cylinders and to provide lubrication for the parts enclosed thereby, oppositely disposed pistons in said cylinders, a rigid piston rod connected thereto to connect said pistons, means for slidably engaging the crank on said driven shaft to said piston rod, and means for controlling the flow of fluid through said annular fluid passageway whereby the speed of the driven means will be varied in proportion to the speed of the driving means.

8. In combination, a fly-wheel connected to a driving means, a driven shaft having a crank supported within said fly wheel, means to form an annular passageway in said fly wheel, cylinders oppositely disposed in said fly wheel arranged radially thereof and communicating with said annular passageway and having means for varying leakage therethrough from said passageway, means to form a chamber within said fly wheel adapted to receive leakage from said cylinders, oppositely disposed pistons in said cylinders, a rigid piston rod connected thereto to connect said pistons, means for slidably engaging the crank on said driven shaft to said piston rod, means for controlling the flow of fluid through said annular fluid passageway whereby the speed of the driven means will be varied in proportion to the speed of the driving means, and pump means operated by relative movement between the fly wheel and driven shaft to replenish the fluid in the annular passageway with fluid that has collected within said chamber.

9. In combination, a fly-wheel connected to a driving means, a driven shaft having a crank supported within said fly wheel, means to form an annular passageway in said fly wheel, cylinders oppositely disposed in said fly wheel arranged radially thereof and communicating with said annular passageway, means to form a chamber within said fly wheel adapted to receive leakage from said cylinders, oppositely disposed pistons in said cylinders, a rigid piston rod connected thereto to connect said pistons, means for slidably engaging the crank on said driven shaft to said piston rod, means for controlling the flow of fluid through said annular fluid passageway whereby the speed of the driven means will be varied in proportion to the speed of the driving means, means to replenish the fluid in the annular passageway with fluid that has collected within said chamber, and means for regulating the speed of said replenishment according to the relative speed of the driven means and the driving means.

10. In combination, a fly-wheel connected to a driving means, a driven shaft having a crank supported within said fly wheel, means to form an annular passageway in said fly wheel, cylinders oppositely disposed in said fly-wheel arranged radially thereof and communicating with said annular passageway, means to form a chamber within said fly wheel adapted to receive leakage from said cylinders, oppositely disposed pistons in said cylinders, a rigid piston rod connected thereto to connect said pistons, means for slidably engaging the crank on said driven shaft to said piston rod, means for controlling the flow of fluid through said annular fluid passageway whereby the speed of the driven means will be varied in proportion to the speed of the driving means, means to replenish the fluid in the annular passageway with fluid that has collected within said chamber, means for regulating the speed of said replenishment according to the relative speeds of the driven means and driving means, and means for scooping fluid within said chamber that has been moved outwardly centrifugally by the movement of said fly-wheel.

11. In combination, a hollow fly-wheel having a cover, said fly-wheel being connected to a driving means, an annular passageway formed in the periphery of said fly-wheel having oppositely disposed, radially arranged cylinders communicating with said annular passageway, a central chamber in said flywheel communicating with the other ends of said cylinders, pistons in said cylinders and a rigid piston rod rigidly connected to said oppositely disposed pistons with a slotted guideway formed therein, a driven shaft having a crank and slide block mounted in said guideway, means for regulating the flow through said annular passageway of fluid therein and additional means for maintaining the quantities of fluid in said passageway and said chamber constant regardless of leakage through the cylinders from the passageway to the chamber.

12. In combination, a hollow fly-wheel having a cover, said fly-wheel being connected to a driving means, an annular passageway formed in the periphery of said fly-wheel having oppositely disposed, radially arranged cylinders communicating with said annular passageway, pistons in said cylinders and a rigid piston rod rigidly connected to said oppositely disposed pistons with a slotted guideway formed therein, a driven shaft having a crank and slide block mounted in said guideway, means for regulating the flow through said annular passageway of fluid therein, and a supplementary pump driven by relative rotation between said fly wheel and said driven shaft adapted to remove fluid from the interior of said fly-wheel and deliver it to said annular passageway.

13. In combination, a pair of oppositely-disposed, bodily rotatable cylinders, pistons therein, a rigid piston rod connecting said pistons, means forming a passageway for connecting the outer ends of said cylinders to one another, and means forming a chamber connecting the opposite ends of the cylinders to receive leakage from said passageway through said cylinders, means for regulating the flow of fluid through said passageway from one cylinder to the other, and means for maintaining constant quantities of fluid in the passageway and in the chamber and a driven shaft connected to said rigid piston rod so as to be rotated thereby, said cylinders being connected to a driven means.

14. In combination, a pair of oppositely disposed, bodily rotatable cylinders, pistons therein, a rigid piston rod connecting said pistons, means forming a passageway for connecting the outer ends of said cylinders to one another, means for regulating the flow of fluid through said passageway from one cylinder to the other, a driven shaft connected to said rigid piston rod so as to be rotated thereby, said cylinders being connected to a driven means, and means of collecting the leakage from said cylinders and returning it to the passageway connecting said cylinders to maintain a constant quantity of fluid in said passageway regardless of leakage therefrom through said cylinders, said last-named means including a gear pump.

PLES PATTERSON.